United States Patent
Yu et al.

(10) Patent No.: US 9,667,561 B2
(45) Date of Patent: May 30, 2017

(54) PACKET OUTPUT CONTROLLER AND METHOD FOR DEQUEUING MULTIPLE PACKETS FROM ONE SCHEDULED OUTPUT QUEUE AND/OR USING OVER-SCHEDULING TO SCHEDULE OUTPUT QUEUES

(71) Applicant: MEDIATEK INC., Hsin-Chu (TW)

(72) Inventors: Yi-Hsin Yu, Hsinchu County (TW); Yu-Hsun Chen, Hsinchu County (TW); Jui-Tse Lin, Hsinchu County (TW); Ta Hsing Liu, Sunnyvale, CA (US)

(73) Assignee: MEDIATEK INC., Hsin-Chu (TW)

( * ) Notice: Subject to any disclaimer, the term of this patent is extended or adjusted under 35 U.S.C. 154(b) by 133 days.

(21) Appl. No.: 14/254,893

(22) Filed: Apr. 17, 2014

(65) Prior Publication Data

US 2014/0321476 A1 Oct. 30, 2014

Related U.S. Application Data

(60) Provisional application No. 61/816,251, filed on Apr. 26, 2013.

(51) Int. Cl.
*H04L 12/875* (2013.01)
*H04L 12/863* (2013.01)

(52) U.S. Cl.
CPC .......... *H04L 47/56* (2013.01); *H04L 47/6235* (2013.01)

(58) Field of Classification Search
None
See application file for complete search history.

(56) References Cited

U.S. PATENT DOCUMENTS 6,161,160 A 12/2000 Niu
7,554,919 B1 * 6/2009 Veeragandham ... H04L 12/5693
370/236

(Continued)

FOREIGN PATENT DOCUMENTS

| CN | 1292568 C | 12/2006 |
| CN | 101478483 A | 7/2009 |
| CN | 102340443 A | 2/2012 |

OTHER PUBLICATIONS

"International Search Report" mailed on Jul. 29, 2014 for International application No. PCT/CN2014/076206, International filing date: Apr. 25, 2014.

*Primary Examiner* — Brian Roberts
(74) *Attorney, Agent, or Firm* — Winston Hsu; Scott Margo

(57) ABSTRACT

One packet output controller includes a scheduler and a dequeue device. The scheduler performs a single scheduler operation to schedule an output queue selected from a plurality of output queues associated with an egress port. The dequeue device dequeues multiple packets from the scheduled output queue decided by the single scheduler operation. Another packet output controller includes a scheduler and a dequeue device. The scheduler performs a plurality of scheduler operations each scheduling an output queue selected from a plurality of output queues associated with an egress port. The scheduler performs a current scheduler operation, regardless of a status of a packet transmission of a scheduled output queue decided by a previous scheduler operation. The dequeue device dequeues at least one packet from the scheduled output queue decided by the current scheduler operation after the packet transmission of the scheduled output queue decided by the previous scheduler operation is complete.

12 Claims, 8 Drawing Sheets

(56) References Cited

U.S. PATENT DOCUMENTS

| | | | | |
|---|---|---|---|---|
| 7,646,717 B1 * | 1/2010 | Anker | ............... | H04L 12/5693 370/235 |
| 7,792,131 B1 * | 9/2010 | Ma | ............... | H04L 12/5693 370/230 |
| 7,990,858 B2 * | 8/2011 | Iny | ............... | H04L 12/5693 370/229 |
| 8,565,250 B2 | 10/2013 | Nemawarkar | | |
| 2005/0220115 A1 * | 10/2005 | Romano | ............... | H04L 49/90 370/395.4 |
| 2006/0221978 A1 | 10/2006 | Venkatachalam | | |
| 2012/0023498 A1 | 1/2012 | Sundararaman | | |

\* cited by examiner

PACKET OUTPUT CONTROLLER AND METHOD FOR DEQUEUING MULTIPLE PACKETS FROM ONE SCHEDULED OUTPUT QUEUE AND/OR USING OVER-SCHEDULING TO SCHEDULE OUTPUT QUEUES

CROSS REFERENCE TO RELATED APPLICATIONS

This application claims the benefit of U.S. provisional application No. 61/816,251, filed on Apr. 26, 2013 and incorporated herein by reference.

BACKGROUND

The disclosed embodiments of the present invention relate to forwarding packets, and more particularly, to a packet output controller and method for dequeuing multiple packets from one scheduled output queue and/or using over-scheduling to schedule output queues.

A network switch is a computer networking device that links different electronic devices. For example, the network switch receives an incoming packet generated from a source electronic device connected to it, and transmits an outgoing packet derived from the received packet to one or more destination electronic devices for which the received packet is meant to be received. In general, the network switch has a packet buffer for buffering packet data of packets received from ingress ports, and forwards the packets stored in the packet buffer through egress ports.

Concerning ingress packets to be forwarded through the same egress port, the ingress packets come from source electronic device connected to different ingress ports. Hence, the network switch may create a plurality of output queues for ingress packets received by different ingress ports, respectively. For example, each of the output queues corresponding to the same egress port may be simply built by storing packet identifiers (packet IDs) of packets to thereby record a packet linked list indicative of an output sequence of the packets actually stored in the packet buffer. Since there are multiple output queues, a scheduler is therefore needed to perform a plurality of scheduler operations each used for making one output queue decision that indicates which output queue is granted to output one packet to the egress port.

In general, the processing time required by a single scheduler operation should be shorter than a minimum packet transmission time (e.g., a transmission time of a 64-byte packet) to achieve the desired line rate. When the line rate becomes higher, the minimum packet transmission time is shorter accordingly. For example, when the network switch is used in a 10 Gigabit Ethernet (10 GbE) environment, the minimum packet transmission time may be 67.2 ns (nanosecond); when the network switch is used in a 40 Gigabit Ethernet (40 GbE) environment, the minimum packet transmission time may be 16.8 ns; and when the network switch is used in a 100 Gigabit Ethernet (100 GbE) environment, the minimum packet transmission time may be 6.72 ns. If the packet transmission of one packet dequeued from an output queue selected by one output queue decision is already complete and the scheduler fails to make another output queue decision in time, the line rate of the egress port may decrease due to no packet transmission. Hence, regarding a high-speed network application, how to design a network switch meeting the strict scheduler timing constraint is a challenge to designers in the pertinent field.

SUMMARY

In accordance with exemplary embodiments of the present invention, a packet output controller and method for dequeuing multiple packets from one scheduled output queue and/or using over-scheduling to schedule output queues are proposed to solve the above-mentioned problem.

According to a first aspect of the present invention, an exemplary packet output controller is disclosed. The exemplary packet output controller includes a scheduler and a dequeue device. The scheduler is arranged to perform a single scheduler operation to schedule an output queue selected from a plurality of output queues associated with an egress port. The dequeue device is arranged to dequeue multiple packets from the scheduled output queue decided by the single scheduler operation.

According to a second aspect of the present invention, another exemplary packet output controller is disclosed. The exemplary packet output controller includes a scheduler and a dequeue device. The scheduler is arranged to perform a plurality of scheduler operations each scheduling an output queue selected from a plurality of output queues associated with an egress port, wherein the scheduler performs a current scheduler operation, regardless of a resultant status of a packet transmission of a scheduled output queue decided by a previous scheduler operation. The dequeue device is arranged to dequeue at least one packet from the scheduled output queue decided by the current scheduler operation after the packet transmission of the scheduled output queue decided by the previous scheduler operation is complete.

According to a third aspect of the present invention, an exemplary packet output method is disclosed. The exemplary packet output method includes: performing a single scheduler operation to schedule an output queue selected from a plurality of output queues associated with an egress port; and dequeuing multiple packets from the scheduled output queue decided by the single scheduler operation.

According to a fourth aspect of the present invention, another exemplary packet output method is disclosed. The exemplary packet output method includes: performing a plurality of scheduler operations each scheduling an output queue selected from a plurality of output queues associated with an egress port, wherein a current scheduler operation is performed, regardless of a resultant status of a packet transmission of a scheduled output queue decided by a previous scheduler operation; and after the packet transmission of the scheduled output queue decided by the previous scheduler operation is complete, dequeuing at least one packet from the scheduled output queue decided by the current scheduler operation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to release the scheduler timing constraint by dequeuing multiple packets from an output queue scheduled by a single scheduler operation and/or using over-scheduling to speed up the output queue decision-making. In this way, the packet bubble (i.e., idle egress port) probability in most cases can be reduced to thereby sustain the desired line rate. Further details of the proposed scheduling/dequeuing design are described hereinafter with reference to the accompanying drawings.

Figure 1:
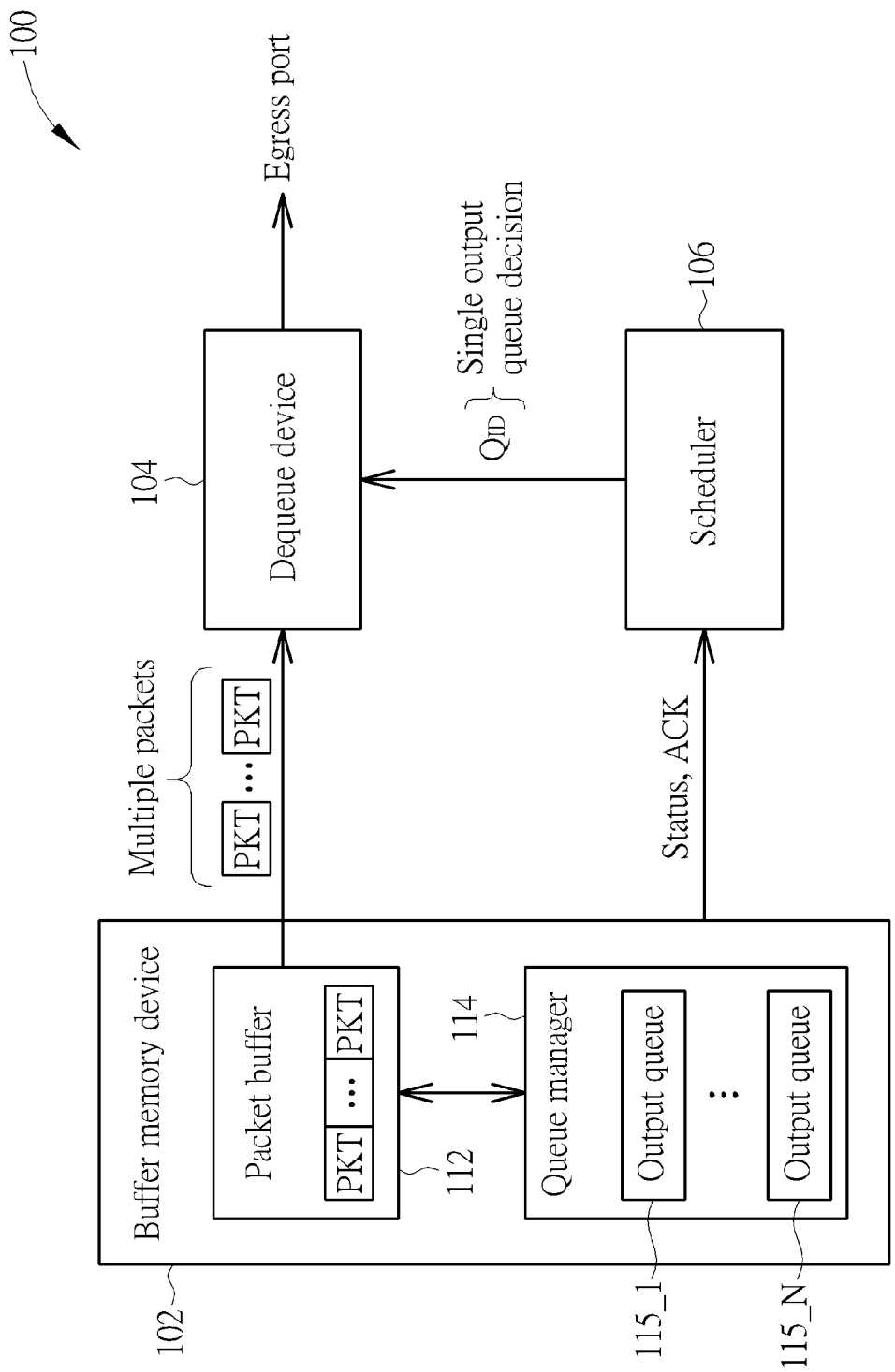
FIG. 1 is a diagram illustrating a network switch according to a first embodiment of the present invention.

FIG. 1 is a diagram illustrating a network switch according to a first embodiment of the present invention. The network switch 100 includes a buffer memory device 102, a dequeue device 104 and a scheduler 106. The buffer memory device 102 includes a packet buffer 112 and a queue manager 114. By way of example, the packet buffer 112 may be implemented using a dynamic random access memory (DRAM), and the queue manager 114 may include static random access memories (SRAMs) to store a plurality of packet linked lists acting as a plurality of output queues 115_1-115_N, respectively. When a packet is received from one of a plurality of ingress ports of the network switch 100, the packet is buffered in the packet buffer 112, and enqueued to one of the output queues 115_1-115_N. For example, packets received from an ingress port I (not shown) and required to be forwarded through an egress port J (not shown) are enqueued to the same output queue $OQ_{I,J}$. For clarity and simplicity, only one egress port is shown in FIG. 1. Hence, a packet received from one of the ingress ports (e.g., port 1-port N) and decided to be forwarded through the egress port is processed by a packet processor (not shown) with many lookup tables according to its packet attribute. Thus, the packet is enqueued to one of the output queues 115_1-115_N maintained by the queue manager 114. The scheduler 106 is arranged to properly schedule the output queues 115_1-115_N through respective priority configurations, such as rate limitations of packets waiting to be forwarded through the same egress port. However, this is for illustrative purposes only, and is not meant to be a limitation of the present invention.

To relax the memory requirement of the output queues 115_1-115_N, a linked list structure is employed to serve as one output queue. For example, each of the output queues 115_1-115_N is a packet linked list composed of packet identifiers (packet IDs) of packets received from the same ingress port and required to be forwarded through the egress port. Hence, when a specific packet is dequeued from one output queue, a node which stores a packet ID of the specific packet is removed from the packet linked list, and the specific packet is read from the packet buffer 112 and output to the following stage (e.g., dequeue device 104) for packet forwarding through the egress port.

As the packet to be forwarded through the egress port may come from any of the ingress ports, the scheduler 106 is arranged to perform one scheduler operation to make an output queue decision for deciding which of the output queues 115_1-115_N is granted to output its packet data. That is, the scheduler 106 is aware of queue statuses of the output queues 115_1-115_N, where the queue status of one output queue may indicate whether the output queue has packets to be serviced or not; besides, the scheduler 106 is arranged to properly schedule the output queues 115_1-115_N that have packets waiting to be forwarded through the same egress port. After the scheduler 106 makes one output queue decision for granting one output queue, the scheduler 106 does not make the next output queue decision until an acknowledgment message ACK indicative of a resultant status of a packet transmission of the scheduled output queue is received. For example, the acknowledgement message ACK may be EmptyQ_ACK which indicates whether the scheduled output queue will become an empty queue after dequeued by the packet transmission. Thus, one scheduler operation performed by the scheduler 106 includes at least an operation of waiting for an acknowledgment message ACK corresponding to a packet transmission of a current winner output queue and an operation of picking a next winner output queue from a plurality of output queues. In other words, the processing time required by one scheduler operation performed by the scheduler 106 includes at least a wait time and a decision-making time. Hence, the scheduler decision-making operation is triggered after reception of an acknowledgement message ACK of the previous dequeue operation, and is done no later than the end of the packet transmission. To release the scheduling timing constraint, the present invention proposes dequeuing multiple packets for one scheduled output queue based on operating characteristics of the scheduler 106. For example, the operating characteristics of the scheduler 106 may include a minimum time interval between two consecutive output queue decisions made by the scheduler 106.

Figure 2:
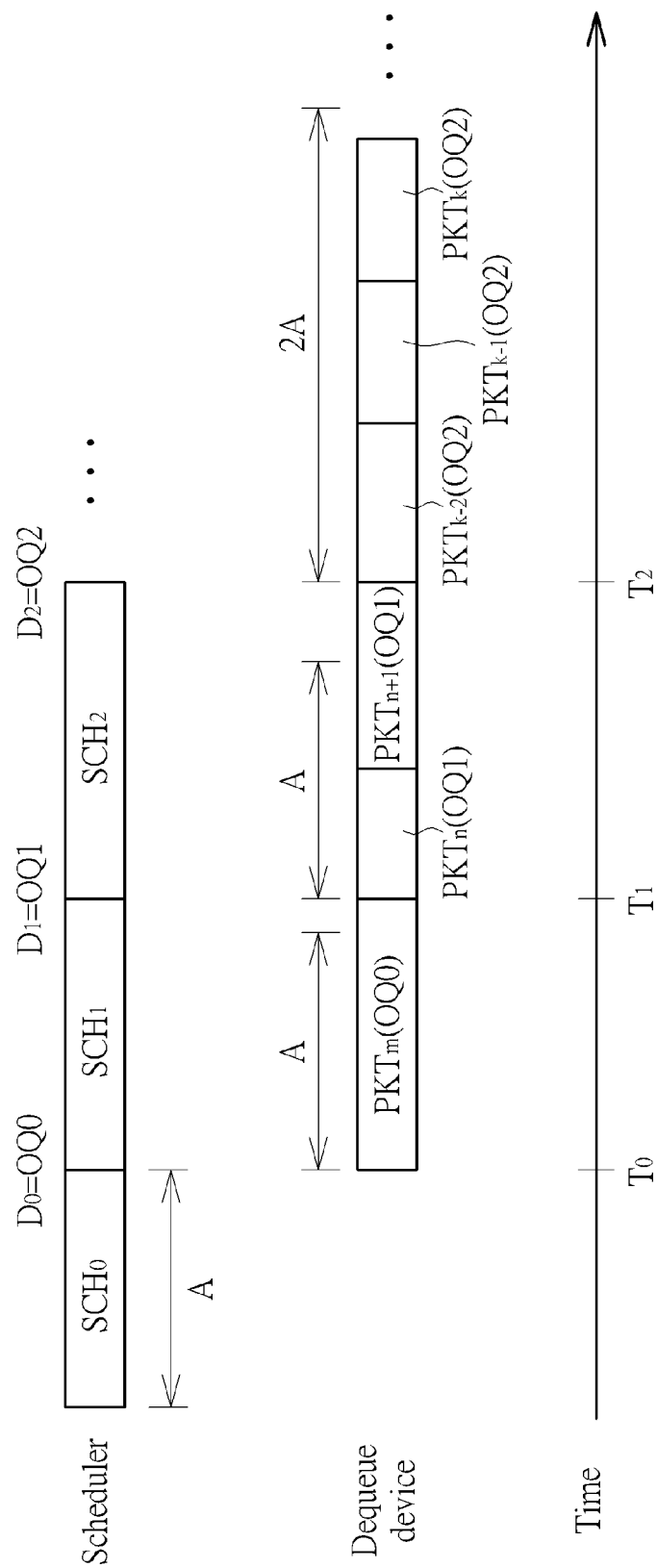
FIG. 2 is a timing diagram illustrating a first proposed solution for releasing the scheduling timing constraint according to an embodiment of the present invention.

Please refer to FIG. 2, which is a timing diagram illustrating a first proposed solution for releasing the scheduling timing constraint according to an embodiment of the present invention. Suppose that each scheduler operation performed by the scheduler 106 requires the processing time equal to an A-byte packet transmission time (i.e., a transmission time of packet data with a size of A bytes), where the processing time of one single scheduler operation includes at least a wait time and a decision-making time as mentioned above. That is, in accordance with operating characteristics of the scheduler 106, a minimum time interval between two consecutive output queue decisions made by the scheduler 106 is equal to a transmission time of packet data with a size of A bytes. At time $T_0$, the scheduler 106 finishes one scheduler operation $SCH_0$ to output one output queue decision $D_0$=OQ0, and starts the next scheduler operation $SCH_1$ (which will wait for the acknowledgement message ACK associated with packet transmission of the scheduled output queue OQ0 and then make an output queue decision). After notified by a queue identifier $Q_{ID}$ of a scheduled output queue decided by the output queue decision $D_0$=OQ0, the dequeue device 104 performs a packet dequeue operation upon a scheduled output queue OQ0 designated by the output queue decision $D_0$=OQ0.

In this embodiment, the dequeue device 104 is allowed to dequeue multiple packets for one scheduled output queue. However, if a packet length of a single packet waiting to be dequeued from the scheduled output queue is not smaller than a threshold value (e.g., A), the dequeue device 104 may dequeue only one packet from the scheduled output queue since the transmission time of this long packet is able to cover the processing time required by one schedule operation for making the next output queue decision. In other words, the next output queue decision will be available at the end of the packet transmission of the current dequeued packet, such that no packet bubble (idle egress port) will happen in this case. As shown in FIG. 2, since packet length of the packet $PKT_m$ waiting to be dequeued from the scheduled output queue OQ0 is not smaller than the threshold value A, the dequeue device 14 only dequeues the packet $PKT_m$ from the scheduled output queue OQ0.

Since the transmission time of the packet $PKT_m$ is longer than the threshold value A (i.e., a minimum time interval between two consecutive output queue decisions made by the scheduler 106), the scheduler operation $SCH_1$ will wait for the end of the packet transmission of the current dequeued packet $PKT_m$ after obtaining the output queue decision $D_1$=OQ1. At time $T_1$, the packet transmission of the dequeued packet $PKT_m$ is complete, the scheduler 106 is triggered to output the output queue decision $D_1$=OQ1 and start the next scheduler operation $SCH_2$ (which will wait for the acknowledgement message ACK associated with packet transmission of the scheduled output queue OQ1 and then make an output queue decision). After notified a queue identifier $Q_{ID}$ of a scheduled output queue decided by the output queue decision $D_1$=OQ1, the dequeue device 104 performs a packet dequeue operation upon a scheduled output queue OQ1 designated by the output queue decision $D_1$=OQ1.

In this embodiment, due to the fact that a packet length of a single packet $PKT_n$ waiting to be dequeued from the scheduled output queue OQ1 is smaller than the threshold value A, the transmission time of this short packet $PKT_n$ fails to cover the processing time required by one schedule operation for making the next output queue decision. Hence, the dequeue device 104 may dequeue more than one packet from the scheduled output queue OQ1, thus allowing the scheduler 106 to obtain the output queue decision $D_2$ no later than the end of the packet transmission of more than one packet. In this embodiment, a total packet length of two packets $PKT_n$ and $PKT_{n+1}$ waiting to be sequentially dequeued from the scheduled output queue OQ1 is not smaller than the threshold value A. Therefore, the next output queue decision $D_2$ is available at the end of the packet transmission of packets $PKT_n$ and $PKT_{n+1}$, such that no packet bubble (idle egress port) will happen in this case. As shown in FIG. 2, the dequeue device 106 would dequeue multiple packets, including $PKT_n$ and $PKT_{n+1}$, from the scheduled output queue OQ1.

Since the transmission time of packets $PKT_n$ and $PKT_{n+1}$ is longer than the threshold value A (i.e., a minimum time interval between two consecutive output queue decisions made by the scheduler 106), the scheduler operation $SCH_2$ will wait for the end of the packet transmission of the dequeued packets $PKT_n$ and $PKT_{n+1}$ after obtaining the output queue decision $D_2$=OQ2. At time $T_2$, the packet transmission of the dequeued packets $PKT_n$ and $PKT_{n+1}$ is complete, and the scheduler 106 is triggered to output the output queue decision $D_2$=OQ2. After notified a queue identifier $Q_{ID}$ of a scheduled output queue decided by the output queue decision $D_2$=OQ2, the dequeue device 104 performs a packet dequeue operation upon a scheduled output queue OQ2 designated by the output queue decision $D_2$=OQ2.

In this embodiment, the output queue OQ2 only has three packets $PKT_{k-2}$, $PKT_{k-1}$, $PKT_k$ when granted to output its packet data, where a packet length of a single packet $PKT_{k-2}$ waiting to be dequeued from the scheduled output queue OQ2 is smaller than the threshold value A, a total packet length of multiple packets $PKT_{k-2}$ and $PKT_{k-1}$ waiting to be sequentially dequeued from the scheduled output queue OQ2 is not smaller than the threshold value A, and a total packet length of all packets $PKT_{k-2}$, $PKT_{k-1}$, $PKT_k$ in the scheduled output queue OQ2 is smaller than another threshold value 2A. If the dequeue device 104 merely dequeues multiple packets $PKT_{k-2}$ and $PKT_{k-1}$ from the scheduled output queue OQ2, a single short packet $PKT_k$ is left in the output queue OQ2. A packet bubble (idle egress port) may happen when the output queue OQ2 is decided as a winner output queue again. To avoid this, the dequeue device 104 is configured to dequeue all packets $PKT_{k-2}$, $PKT_{k-1}$, $PKT_k$ in the scheduled output queue OQ2, thereby preventing a single short packet $PKT_k$ from being left in the scheduled output queue OQ2. Specifically, the dequeue device 104 may compare a total packet length of all packets in the scheduled output queue with a threshold value (e.g., 2A), and refer to the comparison result to decide the multiple packets to be dequeued from the scheduled output queue.

Due to the fact that a total packet length of all packets $PKT_{k-2}$, $PKT_{k-1}$, $PKT_k$ waiting to be sequentially dequeued from the scheduled output queue OQ2 is not smaller than the threshold value A, the transmission time of these packets $PKT_{k-2}$, $PKT_{k-1}$, $PKT_k$ is able to cover the processing time required by one schedule operation for making the next output queue decision. Therefore, the next output queue decision will be available before the packet transmission of all packets $PKT_{k-2}$, $PKT_{k-1}$, $PKT_k$, such that no packet bubble (idle egress port) will happen in this case.

It should be noted that the output queue decisions and packets dequeued from scheduled output queues shown in FIG. 2 are for illustrative purposes only, and are not meant to be limitations of the present invention. For example, any packet dequeue design that dequeues multiple packets from one scheduled output queue decided by a single scheduler operation falls within the scope of the present invention.

Figure 3:
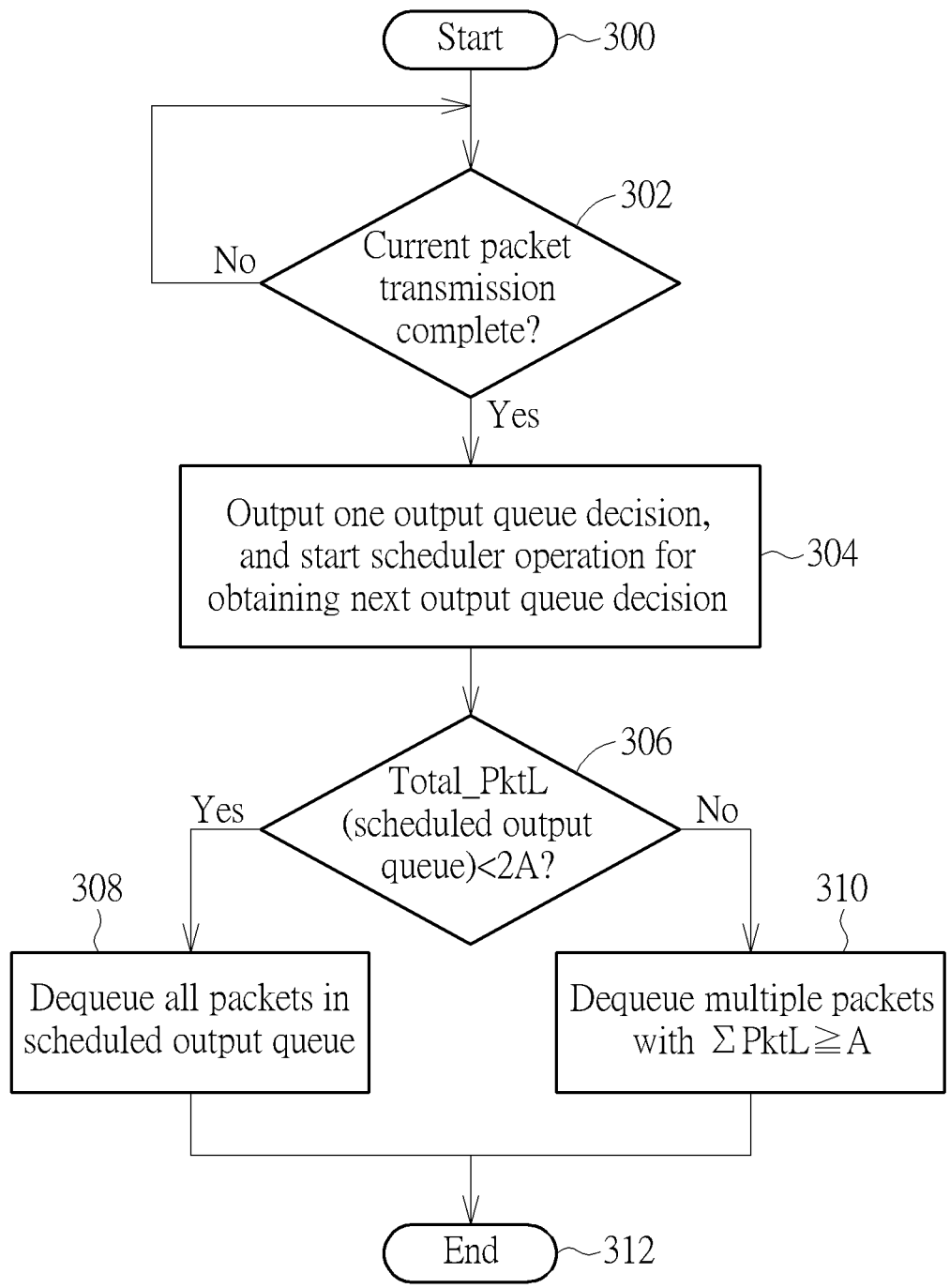
FIG. 3 is a flowchart illustrating a packet output method according to an embodiment of the present invention.

Please refer to FIG. 3, which is a flowchart illustrating a packet output method according to an embodiment of the present invention. Provided that the result is substantially the same, the steps are not required to be executed in the exact order shown in FIG. 3. The packet output method may be employed by the network switch 100 shown in FIG. 1, and may be briefly summarized as below.

Step 300: Start.

Step 302: Check if a current packet transmission of dequeued packet (s) is complete. If yes, go to step 304; otherwise, keep checking the completion of the current packet transmission.

Step 304: Output an output queue decision, and start a scheduler operation for obtaining a next output queue decision.

Step 306: Check if a total packet length of all packets in a scheduled output queue indicated by the output queue decision is smaller than a threshold value 2A (i.e., Total PktL (scheduled output queue)<2A?). If yes, go to step 308; otherwise, go to step 310.

Step 308: Dequeue all of the packets in the scheduled output queue.

Step 310: Dequeue multiple packets with a total packet length not smaller than a threshold value A (i.e., ΣPktL≥A).

Step 312: End.

As a person skilled in the art can readily understand details of each step shown in FIG. 3 after reading above paragraphs, further description is omitted here for brevity.

In one exemplary design, the dequeue device 104 is configured to dequeue multiple packets for one scheduled output queue to thereby release the scheduler timing constraint. Therefore, the scheduler 106 may be implemented using any conventional scheduler design. In an alternative design, the dequeue device may be implemented using any conventional dequeue design, while the scheduler is configured to employ a proposed over-scheduling scheme. The same objective of releasing the scheduler timing constraint is achieved.

Figure 4:
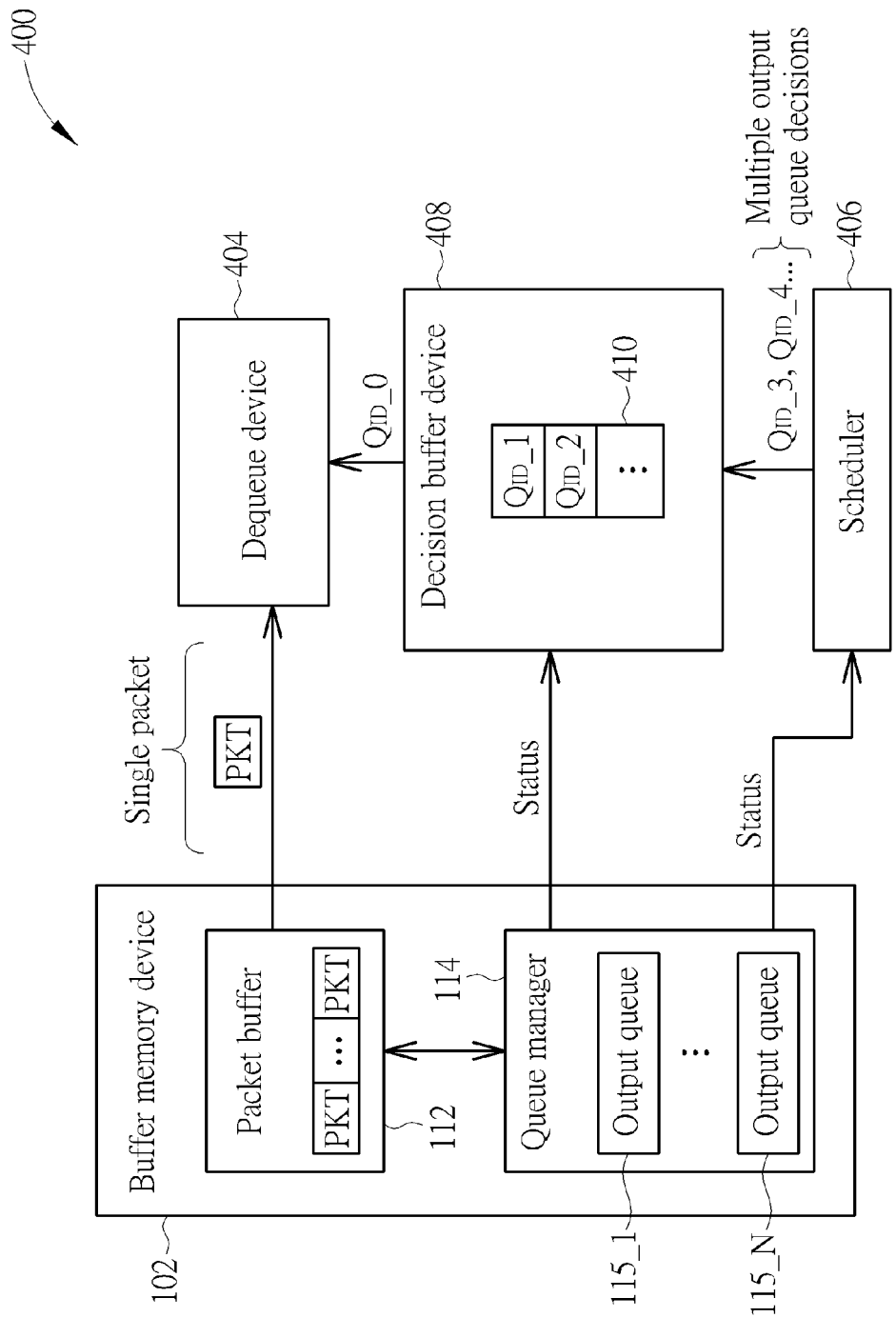
FIG. 4 is a diagram illustrating a network switch according to a second embodiment of the present invention.

Please refer to FIG. 4, which is a diagram illustrating a network switch according to a second embodiment of the present invention. The network switch 400 includes a dequeue device 404, a scheduler 406, a decision buffer device 408, and the aforementioned buffer memory device 102. As mentioned above, the packet to be forwarded through the egress port may come from any of the ingress ports. The scheduler 406 is aware of queue statuses of the output queues 115_1-115_N, where the queue status of one output queue may indicate whether the output queue has packets to be serviced or not; besides, the scheduler 406 is arranged to perform one scheduler operation to make an output queue decision for deciding which of the output queues 115_1-115_N is granted to output its buffered packet data. In this embodiment, the scheduler 406 performs a plurality of scheduler operations each scheduling an output queue selected from a plurality of output queues 115_1-115_N associated with the same egress port, wherein the scheduler 406 performs a current scheduler operation, regardless of a resultant status of a packet transmission of a scheduled output queue decided by a previous scheduler operation.

As mentioned above, after the scheduler 106 makes one output queue decision for granting one output queue, the scheduler 106 does not make the next output queue decision until an acknowledgment message indicative of the resultant status of the packet transmission of the scheduled output queue is received. Thus, one scheduler operation performed by the scheduler 106 includes at least an operation of waiting for an acknowledgment message corresponding to a packet transmission of a current winner output queue and an operation of picking a next winner output queue from a plurality of candidate output queues. To release the scheduling timing constraint, the present invention further proposes using an over-scheduling scheme. The major difference between the schedulers 106 and 406 is that one scheduler operation performed by the scheduler 406 excludes an operation of waiting for an acknowledgment message corresponding to a packet transmission of a scheduled output queue. For example, the scheduler 406 may directly perform an operation of picking a winner output queue from a plurality of candidate output queues. In other words, the processing time required by one scheduler operation performed by the scheduler 406 may include a decision-making time with no wait time preceding the decision-making time. Hence, the output queue scheduling performed by the scheduler 406 is de-coupled from the packet dequeuing performed by the dequeue device 404. That is, compared to the scheduler 106, the scheduler 406 can operate independently and have a faster decision-making speed.

It is possible that the scheduler 406 outputs an output queue decision before the end of the current transmission of one dequeued packet. Hence, the decision buffer device 408 is implemented to buffer output queue decisions sequentially generated from the scheduler 406. In this embodiment, the decision buffer device 408 has a single first-in first-out (FIFO) buffer 410. Hence, the scheduler 406 may output a queue identifier $Q_{ID}$ of a scheduled output queue decided by a current scheduler operation to the FIFO buffer 410 before the packet transmission of a scheduled output queue decided by a previous scheduler operation is complete. In this embodiment, the dequeue device 404 refers to each queue identifier read from the FIFO buffer 410 to dequeue a single packet from a scheduled output queue corresponding to the queue identifier.

Since the scheduler decision-making operation of the scheduler 406 is triggered before the acknowledgement message of the previous dequeue operation (e.g., EmptyQ_ACK), i.e., regardless of the acknowledgement message of the previous dequeue operation (e.g., EmptyQ_ACK), it is possible that an output queue with no packet to be dequeued is selected as one scheduled output queue and the queue ID thereof is stored into the FIFO buffer 410. If the dequeue device 404 performs a dequeue operation upon this empty output queue, packet bubble (idle egress port) will occur due to no packet transmission. In this embodiment, based on the queue manager status, the decision buffer device 408 may cancel the decision of an empty output queue (e.g., $Q_{ID}\_1$) in the FIFO buffer 410, and then select the next decision (e.g., $Q_{ID}\_2$) in the FIFO buffer 410.

Figure 5:
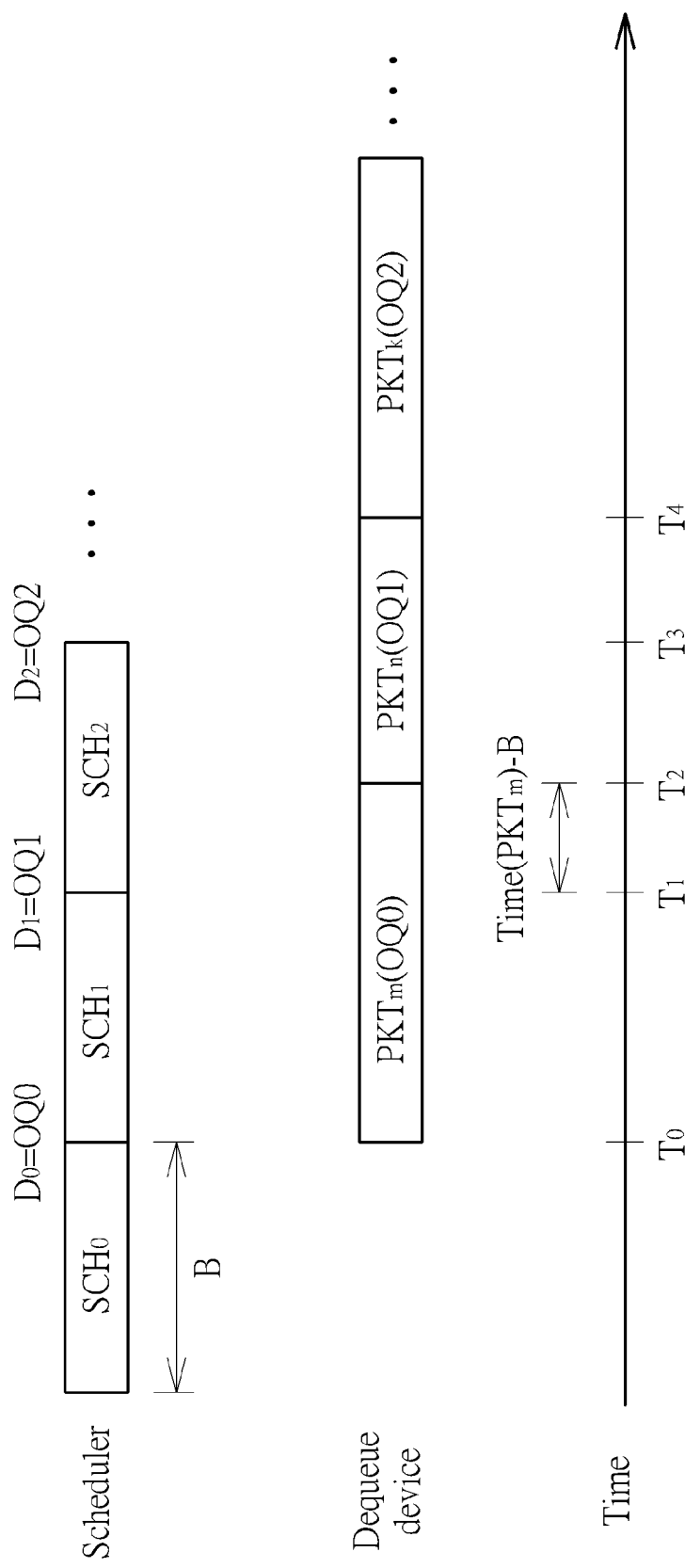
FIG. 5 is a timing diagram illustrating a second proposed solution for releasing the scheduling timing constraint according to an embodiment of the present invention.

Please refer to FIG. 5, which is a timing diagram illustrating a second proposed solution for releasing the scheduling timing constraint according to an embodiment of the present invention. Suppose that each scheduler operation performed by the scheduler 406 requires the processing time equal to a B-byte packet transmission time (i.e., a transmission time of packet data with a size of B bytes), where the processing time of one single scheduler operation includes a decision-making time as mentioned above. In other words, a minimum time interval between two consecutive output queue decisions made by the scheduler 406 is equal to a transmission time of packet data with a size of B bytes, where B<A. At time $T_0$, the scheduler 406 finishes one scheduler operation $SCH_0$ to output one output queue decision $D_0=OQ0$, and starts the next scheduler operation $SCH_1$. After notified a queue identifier $Q_{ID}$ of a scheduled output queue decided by the output queue decision $D_0=OQ0$, the dequeue device 404 performs a packet dequeue operation upon a scheduled output queue OQ0 designated by the output queue decision $D_0=OQ0$. In this embodiment, the dequeue device 404 is configured to dequeue a single packet for one scheduled output queue. As shown in FIG. 5, the dequeue device 404 only dequeues the packet $PKT_m$ from the scheduled output queue OQ0.

At time $T_1$, the packet transmission of the dequeued packet $PKT_m$ is not complete; however, the scheduler 406 outputs the output queue decision $D_1=OQ1$, and starts the next scheduler operation $SCH_2$. At time $T_2$, the packet transmission of the dequeued packet $PKT_m$ is complete, and the dequeue device 404 performs a packet dequeue operation upon the next scheduled output queue OQ1 to start dequeuing the packet $PKT_n$ from the scheduled output queue OQ1. The dequeued packet $PKT_m$ is a long packet, such that the transmission time Time ($PKT_m$) of the packet $PKT_m$ with the packet length $PktL(PKT_m)$ is longer than the processing time of one single scheduler operation (i.e., B-byte packet transmission time). In a case where the next dequeued packet $PKT_n$ is a short packet, the time (Time ($PKT_m$)−B) saved by the over-scheduling scheme allows the scheduler 406 to start the scheduler operation $SCH_2$ before the dequeue device 404 starts the packet transmission of the dequeued packet $PKT_n$ decided by the scheduler operation $SCH_1$, which increases the probability that the scheduler 106 can obtain the output queue decision $D_2$ no later than the end of the packet transmission of the dequeued packet $PKT_n$. As shown in FIG. 5, the scheduler operation $SCH_2$ outputs the output queue decision D2=OQ2 at time $T_3$ (which is prior to the time $T_4$ at which the packet transmission of the dequeued packet $PKT_n$ is complete), and the dequeue device 104 starts dequeuing the packet $PKT_k$ from the scheduled output queue OQ2 at time T4. In this way, no packet bubble (idle egress port) will happen in this case.

It should be noted that the output queue decisions and packets dequeued from scheduled output queues shown in FIG. 5 are for illustrative purposes only, and are not meant to be limitations of the present invention. For example, any scheduler design that makes multiple output queue decisions in an over-scheduling manner falls within the scope of the present invention.

Figure 6:
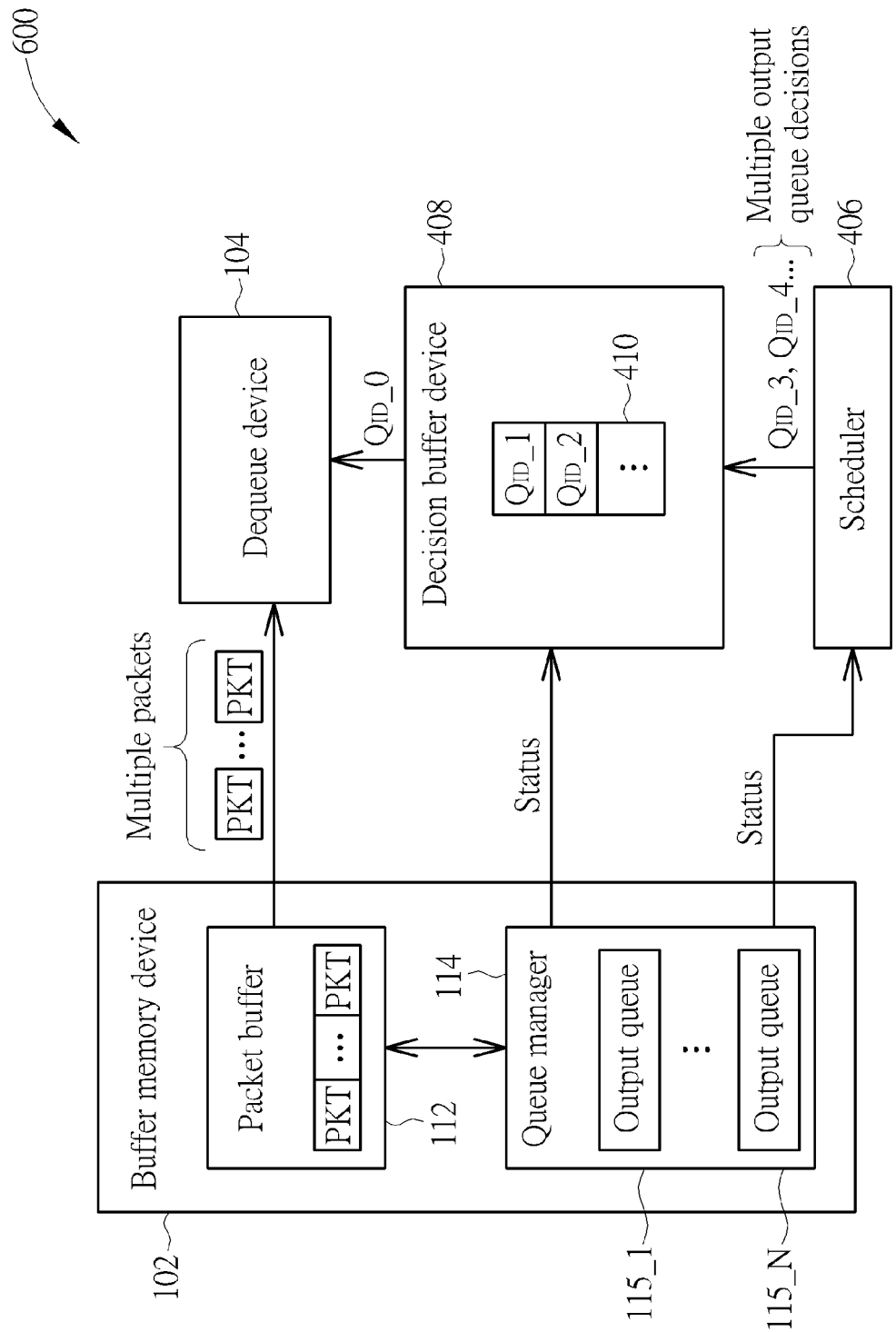
FIG. 6 is a diagram illustrating a network switch according to a third embodiment of the present invention.

In above example shown in FIG. 4, the dequeue device 404 is configured to dequeue a single packet for a scheduled output queue decided by a single scheduler operation. In an alternative design, the network switch may employ the proposed over-scheduling scheme and the proposed multi-packet dequeue scheme to release the scheduler timing constraint. The optimized packet forwarding performance can be achieved by reducing the packet bubble (idle egress port) probability in most cases. Please refer to FIG. 6, which is a diagram illustrating a network switch according to a third embodiment of the present invention. The network switch 600 includes the aforementioned dequeue device 104, scheduler 406, decision buffer device 408 and buffer memory device 102. Specifically, the network switch 600 is obtained by replacing the dequeue device 404 in the network device 400 with the dequeue device 104 shown in FIG. 1. As a person skilled in the art can readily understand operation and function of each component in the network switch 600 after reading above paragraphs, further description is omitted here for brevity.

Figure 7:
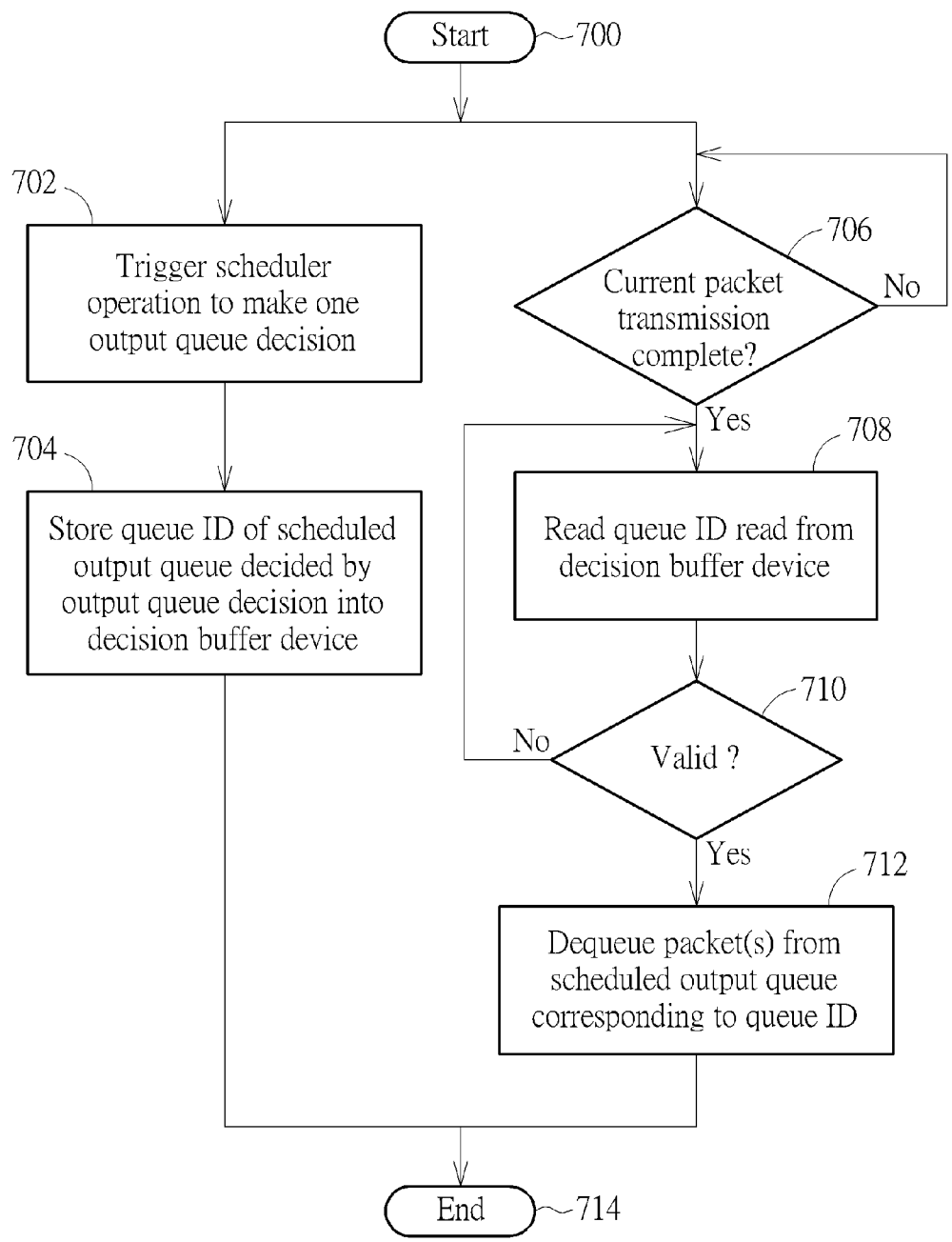
FIG. 7 is a flowchart illustrating a packet output method according to another embodiment of the present invention.

Please refer to FIG. 7, which is a flowchart illustrating a packet output method according to another embodiment of the present invention. Provided that the result is substantially the same, the steps are not required to be executed in the exact order shown in FIG. 7. The packet output method may be employed by the network switch 400/600, and may be briefly summarized as below.

Step 700: Start.

Step 702: Trigger a scheduler operation to make an output queue decision.

Step 704: Store a queue identifier (ID) of a scheduled output queue decided by the output queue decision into a decision buffer device. Go to step 710.

Step 706: Check if a current packet transmission of dequeued packet(s) is complete. If yes, go to step 708; otherwise, keep checking the completion of the current packet transmission.

Step 708: Read a queue ID from the decision buffer device.

Step 710: Check if the queue ID is a valid queue (i.e., a non-empty queue). If yes, go to step 712; otherwise, go back to step 708 to select the next queue ID.

Step 712: Dequeue packet(s) from the output queue corresponding to the queue ID.

Step 714: End.

As a person skilled in the art can readily understand details of each step shown in FIG. 7 after reading above paragraphs, further description is omitted here for brevity.

Due to the inherent characteristics of the proposed over-scheduling scheme, there may be a performance issue. More specifically, since the scheduler 406 performs a current scheduler operation, regardless of a resultant status of a packet transmission of a scheduled output queue decided by a previous scheduler operation, the output queue decision made by the current scheduler operation may not be the best decision. In above examples shown in FIG. 4 and FIG. 6, the decision buffer device 408 has only one FIFO buffer 410 for buffering queue indices of scheduled output queues associated with the same egress port. In a case where an output queue with a queue ID still buffered in the FIFO buffer 410 is blocked from outputting any packet through the egress port due to certain performance consideration, any of the following queue IDs in the FIFO buffer 410 cannot be output. As a result, the traffic with higher class may be blocked by lower class traffic; the performance will be significantly degraded if the packet of lower class traffic is a long packet. To solve this issue, the present invention further proposes a class of service (CoS) based FIFO design. More specifically, packets belonging to services with different priorities may be categorized into packet traffics with different traffic classes when forwarded through the egress port. The present invention therefore proposes assigning different decision FIFO buffers to different traffic classes, thus preventing the traffic with lower traffic class from blocking traffic with higher traffic class. Further details are described as below.

Figure 8:
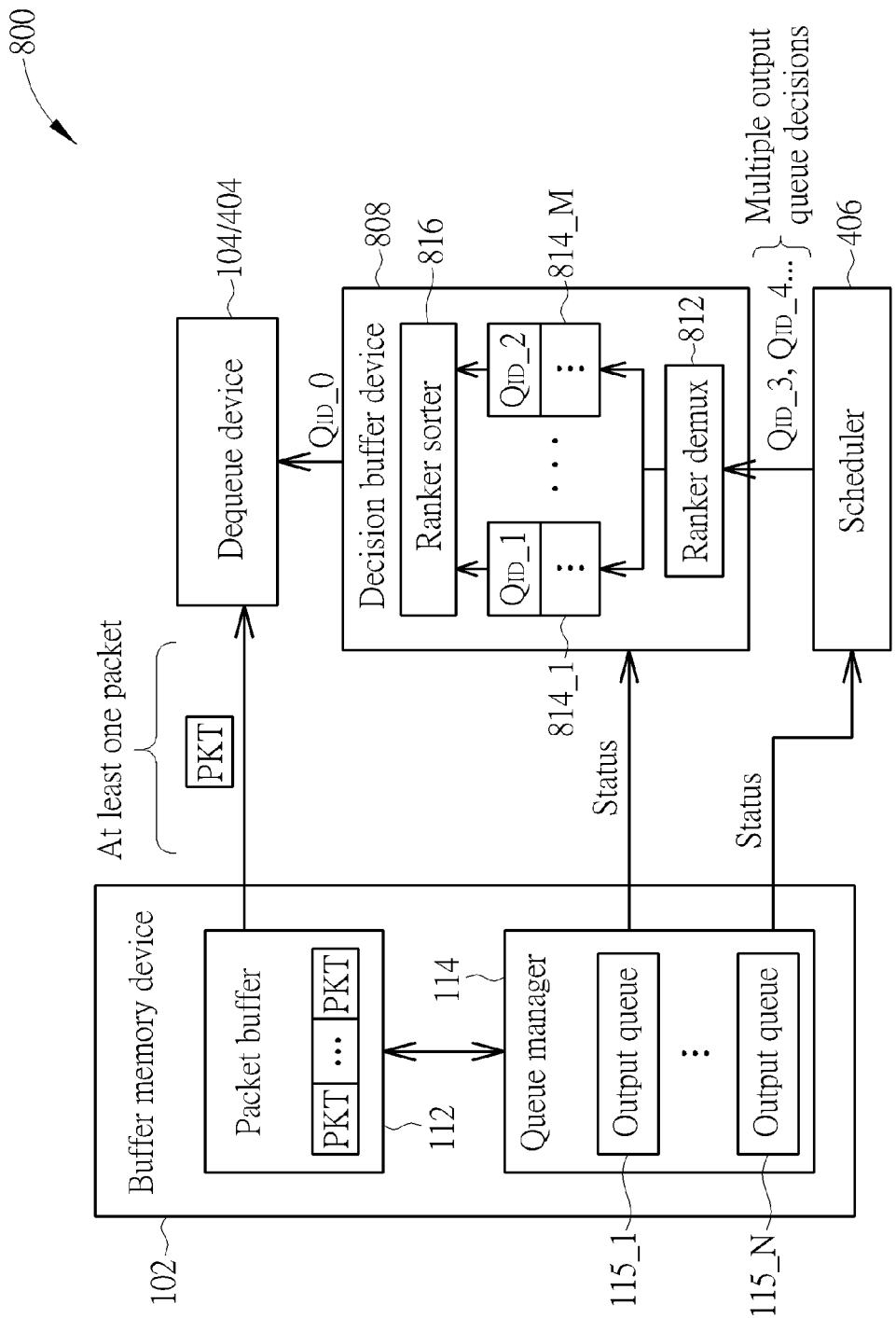
FIG. 8 is a diagram illustrating a network switch according to a fourth embodiment of the present invention.

Please refer to FIG. 8, which is a diagram illustrating a network switch according to a fourth embodiment of the present invention. The network switch 800 includes a decision buffer device 808 and the aforementioned dequeue device 104/404, scheduler 406 and buffer memory device 102. In this embodiment, the decision buffer device 808 includes a ranker 812, a plurality of FIFO buffers 814_1-814_M corresponding to different traffic classes, and a ranker sorter 816. The ranker demux 812 is arranged to store a queue index of a scheduled output queue decided by each scheduler operation performed by the scheduler 406 to one of the FIFO buffers 814_1-814_M based on a traffic class of the scheduled output queue. Besides, a ranker sorter 816 may further sort queue indices over the FIFO buffers 814_1-814_M based on corresponding priority settings, thereby properly adjusting the output sequence of the queue indices in the decision FIFOs. In this embodiment, the decision buffer device 808 has multiple FIFO buffers rather than a single FIFO buffer. When a lower-priority output queue with a queue ID still buffered in one FIFO buffer corresponding to a lower traffic class is blocked from outputting any packet through the egress port due to certain performance consideration, a higher-priority output queue with a queue ID still buffered in another FIFO buffer corresponding to a higher traffic class is allowed to be selected for outputting its buffered packet data. In this way, the desired line rate of the egress port can be sustained.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A packet output method, comprising:
performing a single scheduler operation to schedule an output queue selected from a plurality of output queues associated with an egress port; and
dequeuing multiple packets from the scheduled output queue decided by the single scheduler operation, wherein a total packet length of the multiple packets dequeued from the scheduled output queue is not smaller than a threshold value, and the threshold value is set based on operating characteristics of scheduler operations.

2. The packet output method of claim 1, wherein a minimum time interval between two consecutive output queue decisions made by scheduler operations is equal to a transmission time of packet data with a size of A, and the threshold value is set by A.

3. A packet output method comprising:
performing a single scheduler operation to schedule an output queue selected from a plurality of output queues associated with an egress port;
comparing a total packet length of all packets in the scheduled output queue with a threshold value;
referring to a comparison result to decide multiple packets to be dequeued from the scheduled output queue; and
dequeuing the multiple packets from the scheduled output queue decided by the single scheduler operation.

4. The packet output method of claim 3, wherein a minimum time interval between two consecutive output queue decisions made by scheduler operations is equal to a transmission time of packet data with a size of A, and the threshold value is set by 2A.

5. The packet output method of claim 4, wherein when the comparison result indicates that the total packet length in the scheduled output queue is smaller than 2A, the multiple packets are all packets in the scheduled output queue.

6. The packet output method of claim 4, wherein when the comparison result indicates that the total packet length in the scheduled output queue is not smaller than 2A, a packet length of the multiple packets is not smaller than A.

7. A packet output method, comprising:
performing a plurality of scheduler operations each scheduling an output queue selected from a plurality of output queues associated with an egress port, wherein a current scheduler operation is performed, regardless of a packet transmission of a scheduled output queue decided by a previous scheduler operation; and the current scheduler operation outputs a queue identifier of the scheduled output queue decided by the current scheduler operation before the packet transmission of the scheduled output queue decided by the previous scheduler operation is complete; and
after the packet transmission of the scheduled output queue decided by the previous scheduler operation is complete, dequeuing at least one packet from the scheduled output queue decided by the current scheduler operation.

8. The packet output method of claim 7, further comprising:
buffering a queue identifier of the scheduled output queue decided by the current scheduler operation before the packet transmission of the scheduled output queue decided by the previous scheduler operation is complete;
wherein the step of dequeuing the at least one packet from the scheduled output queue decided by the current scheduler operation comprises:
reading the buffered queue identifier; and
dequeuing the at least one packet from the scheduled output queue corresponding to the buffered queue identifier.

9. The packet output method of claim 8, further comprising:
cancelling a specific buffered queue identifier when a specific output queue corresponding to the specific buffered queue identifier is empty.

10. The packet output method of claim 7, further comprising:
storing a queue identifier of the scheduled output queue decided by each of the scheduler operations to one of a plurality of buffers corresponding to different traffic classes based on a traffic class of the scheduled output queue.

11. The packet output method of claim 10, further comprising:
sorting queue indices over the buffers based on corresponding priority settings.

12. The packet output method of claim 7, wherein the step of dequeuing at least one packet from the scheduled output queue comprises:
dequeuing multiple packets from the scheduled output queue decided by the current scheduler operation.

* * * * *